United States Patent
Moore et al.

(10) Patent No.: US 7,147,699 B2
(45) Date of Patent: Dec. 12, 2006

(54) INK JET PRINTING COMPOSITIONS AND METHODS

(75) Inventors: Cheryl Ann Moore, Suffolk (GB); John H Croker, Herts (GB)

(73) Assignee: Domino Printing Sciences PLC, Cambridge (GB)

( * ) Notice: Subject to any disclaimer, the term of this patent is extended or adjusted under 35 U.S.C. 154(b) by 0 days.

(21) Appl. No.: 10/958,766

(22) Filed: Oct. 5, 2004

(65) Prior Publication Data

US 2005/0043438 A1  Feb. 24, 2005

Related U.S. Application Data

(63) Continuation of application No. 09/961,153, filed on Sep. 21, 2001, now Pat. No. 6,814,791.

(30) Foreign Application Priority Data

Sep. 29, 2000  (EP) .................................. 00308558

(51) Int. Cl.
*C09D 11/02* (2006.01)
(52) U.S. Cl. ............................... 106/31.58; 106/31.86; 106/31.41; 106/31.72
(58) Field of Classification Search ............. 106/31.58, 106/31.86, 31.41, 31.72
See application file for complete search history.

(56) References Cited

U.S. PATENT DOCUMENTS

| | | | | |
|---|---|---|---|---|
| 4,243,694 A | * | 1/1981 | Mansukhani | 427/466 |
| 4,243,994 A | * | 1/1981 | Kobayashi et al. | 347/100 |
| 4,256,492 A | * | 3/1981 | Matsumoto et al. | 106/31.37 |
| 4,421,560 A | * | 12/1983 | Kito et al. | 106/31.2 |
| 4,861,380 A | * | 8/1989 | Campbell et al. | 106/504 |
| 4,990,939 A | * | 2/1991 | Sekiya et al. | 347/62 |
| 5,120,360 A | * | 6/1992 | Tajiri et al. | 106/31.57 |
| 5,282,894 A | * | 2/1994 | Albert et al. | 106/31.46 |
| 5,981,429 A | * | 11/1999 | Kawamura et al. | 503/207 |
| 5,990,197 A | | 11/1999 | Escano et al. | |
| 6,136,889 A | * | 10/2000 | Kato et al. | 523/160 |
| 6,140,389 A | * | 10/2000 | Kato et al. | 523/160 |
| 6,207,613 B1 | * | 3/2001 | Torii et al. | 503/201 |
| 6,294,111 B1 | * | 9/2001 | Shacklett et al. | 252/518.1 |
| 6,409,812 B1 | * | 6/2002 | Ueno et al. | 106/31.51 |
| 6,524,377 B1 | * | 2/2003 | Torii et al. | 106/31.18 |

FOREIGN PATENT DOCUMENTS

| | | | |
|---|---|---|---|
| GB | 2030075 | | 4/1980 |
| JP | 03097776 A | * | 4/1991 |
| JP | 07011183 A | * | 1/1995 |
| WO | PCT/GB92/00276 | | 2/1992 |

OTHER PUBLICATIONS

English Translation of Abstract of JP 03097776 A.*
English Translation of Abstract of JP 07011183 A.*
European Search Rept.
English Translation of Abstract of JP 03097776 A.
English Translation of Abstract of JP 07011183 A.
Information Disclosure Sheet (PTO Form 1449) from parent case, U.S. Appl. No. 09/961,153; filed Sep. 21, 2001.
Notice of References Cited (PTO Form 892) from parent case, U.S. Appl. No. 09/961,153; filed Sep. 21, 2001.
European Search Report.

* cited by examiner

*Primary Examiner*—J. A. Lorengo
*Assistant Examiner*—Veronica Faison-Gee
(74) *Attorney, Agent, or Firm*—Barnes & Thornburg LLP; James B. Conte

(57) ABSTRACT

An ink composition is provided which is suitable for use in an ink jet printer and comprises solvent, colourant and binder, wherein the solvent comprises methyl acetate. The composition is particularly suitable for printing on polymeric substrates, eg polypropylenes and polyethylenes.

18 Claims, No Drawings

INK JET PRINTING COMPOSITIONS AND METHODS

The present application is a continuation of Application 09/961,153, filed Sep. 21, 2001 now U.S. Pat. No. 6,814, 791. The disclosure of the prior application by its entirety is incorporated herein by reference. Application 09/961,153 claims the benefit of the foreign filing date for European 00308558.6 filed Sep. 29, 2000.

FIELD OF THE INVENTION

This invention relates to compositions suitable for ink jet printing and to methods in which these compositions are used for printing on substrates.

BACKGROUND OF THE INVENTION

Ink jet printing methods are well known for application of compositions to a wide range of substrates. Ink jet printing methods are versatile and particularly valuable for printing indicia on substrates used in high speed processes. Examples of such processes include processes of packaging food products in which batch and date information is applied to the packaging. In processes in which the packaging is formed from a polymeric film (e.g. sweet wrappers) the film passes rapidly from the printing station to a position at which the product is wrapped. In such processes it is important that the ink composition is substantially dry before the wrapping process begins, since if it is not then smudging or even removal of the printed indicia can occur. It is also important that the ink has a composition which adheres well to the substrate, since if it does not, in this case also smudging and removal can occur.

Particular problems arise with substrates which are based upon polymers of monomers which include propylene (polypropylenes) or polymers of monomers which include ethylene (polyethylenes). Adherence to these substrates is difficult and is made more difficult when, as is common, they are treated with a release agent (often necessary for subsequent processing of the film to form a product wrapping).

Therefore it would be desirable to be able to provide an ink composition which is capable of rapid drying and is also capable of being formulated to include binder materials which give good adhesion to substrates, in particular the polypropylene- and polyethylene-based substrates mentioned above.

It has been found in the past that solvent components such as methyl ethyl ketone (MEK) and acetone have high drying rate and are thus suitable for use as solvents in compositions which are required to dry rapidly. However, it has been well known for many years that compositions which are formulated to dry rapidly on application to the substrate can give other problems. In particular, rapidly drying ink compositions can lead to problems with blocking of the nozzles, and ink drying in the gutters, of the printing equipment used to apply the ink to the substrate. For this reason inks which include fast drying solvents such as MEK have routinely included humectants and additional solvents known to have higher boiling point, in order to prevent this, which in turn slows down the drying time.

It would be desirable to be able to solve the above mentioned drying and adhesion problems without introducing additional problems of blocking and crusting in the printing equipment. WO92/14794 is concerned with the problem of providing a rapidly drying ink which dissolves commonly-used dyestuffs and is particularly concerned with the problem of replacing the commonly-used solvent MEK. It is also concerned with providing an ink having suitable viscosity. WO92/14794 uses a carrier medium comprising a lower alkyl ester of a lower alkyl carboxylic acid and generally also a lower alkanol. Alkyl moieties for these materials of length C1 to C5 are mentioned generally but the majority of the examples include ethyl acetate, which is the highly preferred alkyl ester for use in WO92/14794. Ethyl butyrate and butyl acetate are also used in other examples.

U.S. Pat. No. 5,990,197 discloses ink formulations generally containing a near infrared fluorophore copolymerised with a polyester, a binder, an organic solvent soluble electrolyte and an organic solvent selected from a $C_3$–$C_6$ aliphatic ketone, a $C_3$–$C_6$ aliphatic ester, a lower aliphatic alcohol or combinations thereof. The example inks use 2-butanone or ethanol or a mixture of the two as the solvent. Methyl acetate is mentioned in a list of $C_3$–$C_6$ aliphatic esters but of these ethyl acetate is said to be preferred.

GB-A-2030075 discloses an ink jet printing process using opaque inks. The ink contains resin or polymer dissolved in a solvent. A wide range of solvents is disclosed, and a list is given reciting aliphatic alcohol, ketones, aldehydes, ethers, esters, glycols, glycol ethers, hydrocarbons and lactones. Methyl acetate is mentioned in a list of ester-type solvents but in the examples the solvents used are methanol or mixtures of methanol with MEK or mixtures of methanol, MEK and acetone.

SUMMARY OF THE INVENTION

According to a first aspect of the invention we provide an ink composition suitable for use in an ink jet printer comprising colourant, binder, and solvent which comprises methyl acetate. We also provide, in a second aspect, a method of printing onto a substrate comprising applying an ink composition to the substrate by an ink jet printing method, in which the ink has a composition which comprises colourant, binder, and solvent which comprises methyl acetate.

Surprisingly, we find that the use of methyl acetate as a component of the solvent allows the production of a composition which simultaneously solves the problems mentioned above. The ink dries sufficiently rapidly to prevent smudging and removal of indicia but does not lead to problems of blocking and crusting of printing equipment and also dissolves the materials preferred for obtaining good adhesion to substrates such as polypropylenes and polyethylenes.

Furthermore, we have found that the composition of the invention allows for the use of a wide range of resins and binder polymers. In particular it permits the use of a wider range than would be possible with acetone and MEK.

In addition, we find surprisingly that compositions according to the invention give faster drying time than compositions in which the known fast-drying solvent MEK is used as the only solvent and even faster than some MEK/acetone blends.

In the invention the solvent comprises, as an essential component, methyl acetate. This solvent component has the advantages, discussed above, of fast drying time without inducing nozzle blocking and gutter crusting problems. It is also capable of dissolving a wide range of binder polymers, especially acetal polymers such as polyvinyl butyrals (PVBs), which are particularly beneficial for provision of adherence properties. We have found that other fast-drying solvents such as acetone and MEK do not dissolve PVB binders except under stringent and harsh conditions unsuitable for use in printing processes.

Methyl acetate has the further advantage of a low photochemical ozone creation potential (POCP) of 2.5. POCP is an arbitrary scale of atmospheric chemical activity based on ethylene at 100 and very stable organic materials at zero.

On this basis, we also provide further aspects of the invention as follows.

In a third aspect of the invention we provide an ink composition suitable for use in an ink jet printer comprising colourant, binder and solvent which comprises methyl acetate and from about 4% to about 22%, by weight based on total weight of composition, ethanol.

In a fourth aspect of the invention we provide an ink composition suitable for use in an ink jet printer comprising colourant, binder and solvent which comprises methyl acetate and acetone.

In a fifth aspect of the invention we provide an ink composition suitable for use in an ink jet printer comprising colourant, binder which comprises an acetal polymer and solvent which comprises methyl acetate.

The invention also provides methods of printing onto a substrate comprising applying an ink composition to the substrate by an ink jet printing method using any of the ink compositions of the third to fifth aspects of the invention.

In a further aspect of the invention we provide a method of printing onto a substrate based on polymers selected from the group consisting of polymers of propylene, polymers of ethylene and polymers of propylene and ethylene, comprising applying an ink composition to the substrate by an ink jet printing method, and the ink has a composition which comprises colourant, binder and solvent which comprises methyl acetate.

In a further aspect of the invention we provide a process for making an ink composition of the invention comprising mixing at least part of the binder and at least part of the solvent to form a first pre-mix, separately mixing all remaining components except colourant to form a second pre-mix, combining the first and second pre-mixes and adding to this mixture the colourant.

DETAILED DESCRIPTION OF THE PREFERRED EMBODIMENTS

The methyl acetate is generally present in the composition in an amount of at least 1%, preferably at least 2%. Especially preferred amounts are at least 5%, more preferably at least 8%. The methyl acetate can be present in any amount, and preferred levels are up to 70%, but generally is not present in amounts of more than 60%. If methyl acetate is used in relatively low amounts, the preferred upper limit is 20%. However, it can be used, in some formulations, in higher amounts of for instance from 30 to 70%, preferably 40 to 60%.

In this specification, unless otherwise stated, percentages are by weight based on total composition.

Preferably the solvent is a blend and also comprises acetone. When present, acetone is preferably used in amounts of at least 2%, and the preferred upper limit is 70%. If used in relatively low amounts acetone can be present in amounts of from 2 to 20%, preferably 6 to 18%. Preferably however acetone is present in relatively high amounts of from 30 to 70%, preferably 40 to 60%.

The composition can comprise ethanol as a cosolvent, generally added in the form of denatured ethanol such as industrial methylated spirit (IMS) which comprises ethanol and low levels (around 4%) methanol, or DEB100, which contains Bitrex denaturant. When present, ethanol is preferably used in an amount of from 4 to 22%, preferably 8 to 17%.

A particularly preferred solvent blend comprises methyl acetate, acetone and ethanol (generally in the form of IMS).

When the preferred solvent blend of methyl acetate/acetone/ethanol is used preferred amounts, based on total solvent blend, are methyl acetate 5 to 25%, preferably 10 to 20%/acetone 50 to 90%, preferably 60 to 80%/ethanol 5 to 25%, preferably 10 to 20%.

The composition may contain other known solvent materials such as other alkyl acetates, other alkyl esters of alkanols, other alkanols and MEK. Preferably however the composition contains substantially no alkyl acetates other than methyl acetate. It is also preferred that the composition contains substantially no MEK, in particular when the binder comprises an acetal polymer such as polyvinyl butyral.

An advantage of the formulation of the invention is that it gives fast drying but without nozzle blocking and gutter crusting problems without the necessity of including humectants or high boiling solvents, which have in the past been routinely used in combination with known fast-drying solvents such as MEK in order to prevent these problems. Thus according to the invention the composition preferably contains substantially no humectant or high boiling solvent. Humectants and high boiling solvents include high boiling glycol ethers such as propylene glycol methyl ethers, N-methyl pyrrolidone, triacetin, amyl acetate (boiling point 142° C.) and methyl cellosolve (boiling point 125° C.) and others may be chosen as desired.

The total solvent or solvent blend generally makes up at least 60%, preferably at least 70%, often at least 85%, of the total composition.

The composition of the invention additionally comprises a binder. Binders may be selected from any of those known in the field. They are generally polymeric and include modified acrylic polymers, cellulosic materials, acetyl polymers, ketone resins, vinyl resins, acrylate polymers, acrylic copolymers, aldehyde resins, phenolic resins, phenolic modified resins, maleic resins, maleic modified resins, polyesters, rosins, rosin esters, modified rosins and modified rosin esters. The rosins and rosin esters (modified or unmodified) are preferably used in an amount of from 2 to 10%.

The binder may be a blend or may be formed from a single binder material. Preferably the binder comprises an acetal polymer, for instance polyvinyl butyral (PVB), alone or with additional binder materials.

When the binder comprises polyinyl butyral it is preferably a grade which contains a relatively high percentage of butyraldehyde. In particular, the PVB preferably has a butyraldehyde content of at least 70%, more preferably at least 75%, in particular at least 80%. It can be preferred that the butyraldehyde content is at least 85%. Percentage butyraldehyde is specified by the manufacturer.

When the butyraldehyde content is relatively high, for instance more than 80% and in particular at least 85%, it can be preferred that the molecular weight of the PVB is relatively low. For instance it may have a solution viscosity below 1000, in particular below 400 and in some cases below 300 cp when determined on a 15% by weight solution in 60:40 toluene:ethanol at 25° C., using a Brookfield viscometer. Alternatively solution viscosity may be not more than 300, preferably not more than 200 and in some cases not more than 100 cp, when determined on 10% solution in 95% ethanol at 25° C. using an Ostwald-Cannon-Fenske viscometer.

Examples of commercially available PVB resins are Pioloform BN18 available from Wacker, Mowital B30HH and Mowital B60HH available from Hoechst AG and Butvar B79 available from Solutia.

Total binder level is preferably at least 2%, often at least 4%. Generally it is not more than 30%, preferably not more than 25%. A preferred range is 5 to 20%.

The composition also includes a colourant. The colourant may be a dye soluble in the composition or a pigment, optionally modified to render it suitable for inclusion in the composition. A preferred class of colourant is chrome based azo dyes, but any suitable colourant may be chosen.

Colourant is generally present in amounts of at least 1%, often not more than 15%, and the amount is preferably in the range 3 to 10%.

The composition may contain any other known components of inks suitable for ink jet printing. These include adhesion promoters, for instance Tilcom (trade name) and alkoxysilanes, preferably in an amount of from 2 to 10%; wetting agents and surfactants, for instance silanes and siloxanes, preferably in an amount of from 0.2 to 15%; plasticisers, for instance phthalates, preferably in an amount of from 0.8 to 3%; conductivity agents, such as quaternary ammonium salts, lithium nitrate and thiocyanates, preferably in an amount of from 0.2 to 4%; other additives for controlling stability and pH, for instance acrylic homopolymers and copolymers, preferably in an amount of from 2 to 8%.

Preferably all components are compatible with food products, since a preferred application of the composition is to wrappers for food products. The composition and its components may be food grade.

The ink compositions may be made up in any known manner. However, a preferred method is as follows and is a further aspect of the invention. In the process of forming the ink composition at least part of the binder and at least part of the solvent are mixed to form a first pre-mix, all remaining ingredients except colourant are mixed to form a second pre-mix and the first pre-mix and second pre-mix are then combined. The colourant is subsequently added.

This process is particularly valuable when the solvent comprises ethanol solvent and/or the binder comprises an acetal polymer such as PVB.

In this process it is preferred that some or all of the methyl acetate is included in the first pre-mix. For instance up to 90%, or up to 70% or 60% of the methyl acetate may be included in the first pre-mix. If acetone is used as part of the solvent then preferably at least some acetone is included in the first pre-mix, for instance up to 60%, 70% or even 90% of the total amount of acetone in the composition. When ethanol is included in the composition it is preferred that all of the ethanol is included in the first pre-mix.

The first pre-mix is preferably made as follows. A proportion of the binder, for instance up to 50% or even up to 70% or 80%, of the binder is mixed with all of the ethanol. Methyl acetate and acetone if used are then added. The remainder of the binder is then added and the components mixed.

In the invention we also provide a method of printing on to a substrate by an ink jet printing method using the ink of the invention. In the method, the composition may have any of the preferred features discussed above in connection with the inks of the invention.

In the method, the composition is applied to a substrate. The invention is particularly beneficial in application to substrates which have hitherto been regarded as difficult to print, for instance due to adhesion problems. In particular, the system of the invention, including methyl acetate as solvent, allows the use of acetal polymers such as PVB as the binder. Thus the invention is especially beneficial when the substrate is polymeric, for instance a polymeric film. Preferably the film is based on a polypropylene or a polyethylene.

The invention gives particular advantages when the substrate is a polymeric film which has been treated with a release agent. This release agent is often necessary for subsequent processing of the film but increases problems with adhesion. In the invention it is possible to combine fast drying and adhesion to substrates of this type.

In the process the ink composition generally dries rapidly after application to the substrate, preferably in not more than one second, more preferably not more than 0.6 seconds.

Thus the invention is beneficial in systems where the substrate is subjected to further processing steps, such as formation into a product wrapping, within one second, preferably within 0.6 seconds, after printing.

The composition may be applied by any known ink jet printing method. In such methods an ink jet printer projects a stream of ink droplets from a printer head to impact on the substrate as the substrate is conveyed, usually at high speed, past the printer head. The droplets are controlled so that they are deposited in a controlled array and the substrate is thereby printed with the desired indicia. The indicia may for instance be code numbers and letters, dates such as "sell by" dates and other alphanumeric data.

The method may be the known "drop-on-demand" method in which ink droplets are generated as required to produce the predetermined array.

Preferably however the method is the known continuous ink jet printing method. A continuous stream of droplets is supplied and the droplets are diverted electrically in order to produce the predetermined array. Droplets which are not deposited on the substrate are collected automatically and recycled to a return tank.

Such methods are well known.

The invention will now be illustrated with reference to the following example.

EXAMPLE

The following is an example of a composition according to the invention. It may be applied to a substrate such as polyethylene or polypropylene film by a continuous ink jet printing method.

| | |
|---|---|
| Acetone | 53.8 |
| IMS | 13.0 |
| Methyl acetate | 12.2 |
| Pioloform BN18 [1] | 7.0 |
| Surcol 860W2 | 4.0 |
| Cellolyn 21E3 | 4.0 |
| Butyl benzyl phthalate | 1.5 |
| Silwet L76224 | 0.5 |
| Orasol RLI5 | 4.0 |

1. Polyvinyl butyl binder supplied by Wacker.
2. Acrylic copolymer supplied by Ciba Specialty Chemicals.
3. Synthetic rosin ester supplied by Hercules.

4. Polyalkyleneoxide modified polydimethylsiloxane supplied by Witco.

5. Black 6 isomer chrome based azo dye.

The invention claimed is:

1. An ink composition suitable for use in an ink jet printer comprising (a) colourant, (b) binder and (c) solvent which comprises methyl acetate, acetone, and ethanol, wherein the amount of methyl acetate is 2–20% by weight based on total weight of composition.

2. A composition according to claim 1 which contains acetone in an amount of from 2 to 70%, based on total weight of composition.

3. A composition according to claim 1 containing ethanol in an amount of from 4 to 22%, based on total weight of composition.

4. A composition according to claim 1 in which the binder comprises one or mare polymers selected from the group consisting of modified acrylic homopolymers or copolymers, cellulosic polymers, aceral polymers, ketone resins, vinyl resins, acrylate polymers, acrylic copolymers, aldehyde resins, phenolic modified resins, maleic modified resins, polyesters, rosins, modified rosins, rosin esters and modified rosin esters.

5. A composition according to claim 4 in which the binder comprises an acetal polymer.

6. A composition according to claim 5 which comprises polyvinyl butyral in an amount of from 5 to 20%, based on total weight of composition.

7. A composition according to claim 1 which contains substantially no acetate esters other than methyl acetate.

8. A composition according to claim 1 which contains substantially no methyl ethyl ketone.

9. A method of printing onto a substrate comprising applying an ink composition to the substrate by an ink jet printing method, in which the ink has a composition which comprises solvent, which comprises methyl acetate, acetone, and ethanol, wherein the amount of methyl acetate is 2–20% by weight based on total weight of composition.

10. A method according to claim 9 in which the substrate has been treated with a release aid.

11. A method according to claim 9 in which the ink is substantially dry in not more than 0.6 seconds, after application to the substrate.

12. An ink composition suitable for use in an ink jet printer comprising (a) colourant, (b) binder and (c) solvent which comprises 2–20% methyl acetate, by weight based on total weight of composition, 4% to 22% ethanol, by weight based on total weight of composition, and acetone.

13. An ink composition suitable for use in an ink jet printer comprising (a) colourant, (b) binder which comprises an acetal polymer and (c) solvent which comprises methyl acetate, acetone, and ethanol, wherein the amount of methyl acetate is 2–20% by weight based on total weight of composition.

14. A process of making an ink composition which is suitable for use in an ink jet printer and which comprises colourant, binder and solvent in which the solvent comprises methyl acetate, acetone, and ethanol, wherein the amount of methyl acetate is 2–20% by weight based on total weight of composition, the process comprising mixing at least part of the binder and at least part of the solvent to form a first pre-mix, mixing the remaining components except the colourant to form a second pre-mix, combining the first pre-mix and the second pre-mix to form a mixture and adding the colourant to the mixture.

15. A composition according to claim 1 which contains acetone in an amount of from 30 to 70%, based on total weight of composition.

16. A composition according to claim 1 containing ethanol in an amount of from 8 to 17%, based on total weight of composition.

17. A composition according to claim 1 which comprises polyvinyl butyral.

18. A method according to claim 9 in which the ink is substantially dry in not more than one second.

* * * * *